C. R. & O. O. KELLER.
BEAN HARVESTER.
APPLICATION FILED SEPT. 2, 1911. RENEWED MAR. 15, 1913.
1,059,301.
Patented Apr. 15, 1913.
3 SHEETS—SHEET 3.
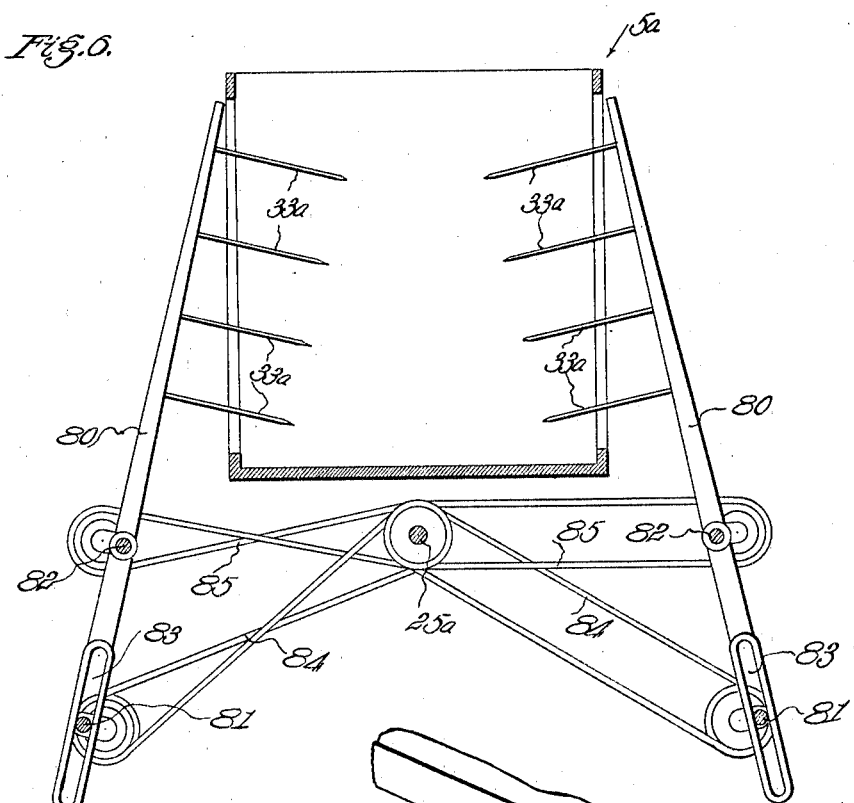
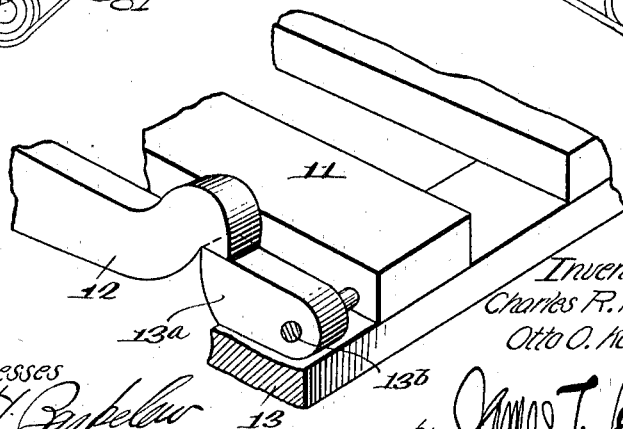

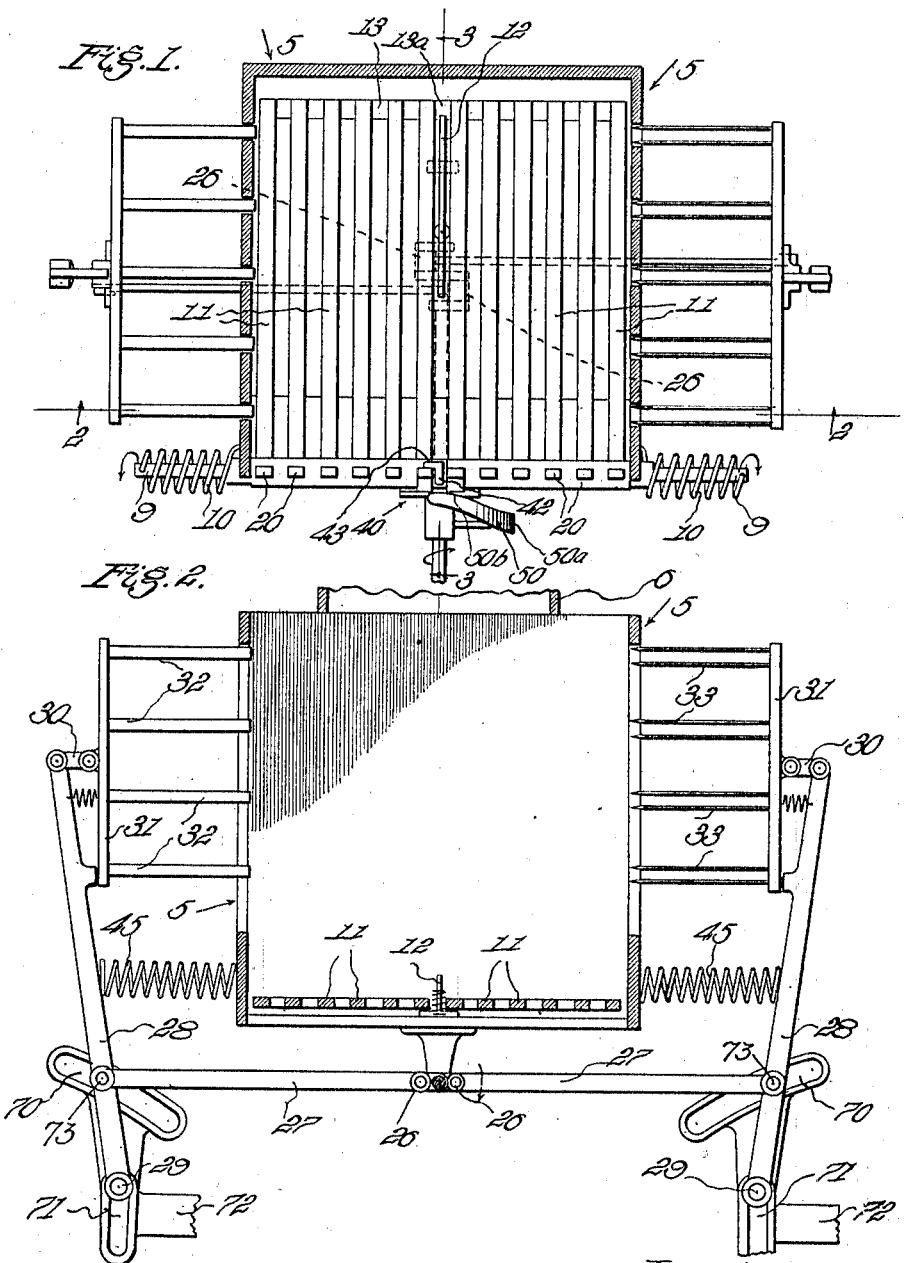

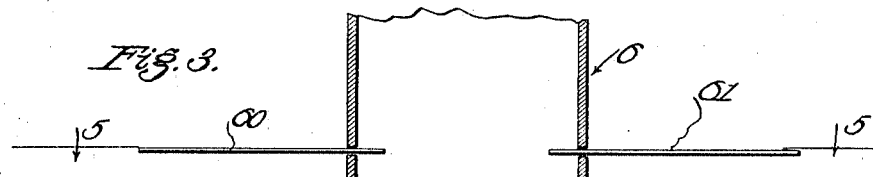
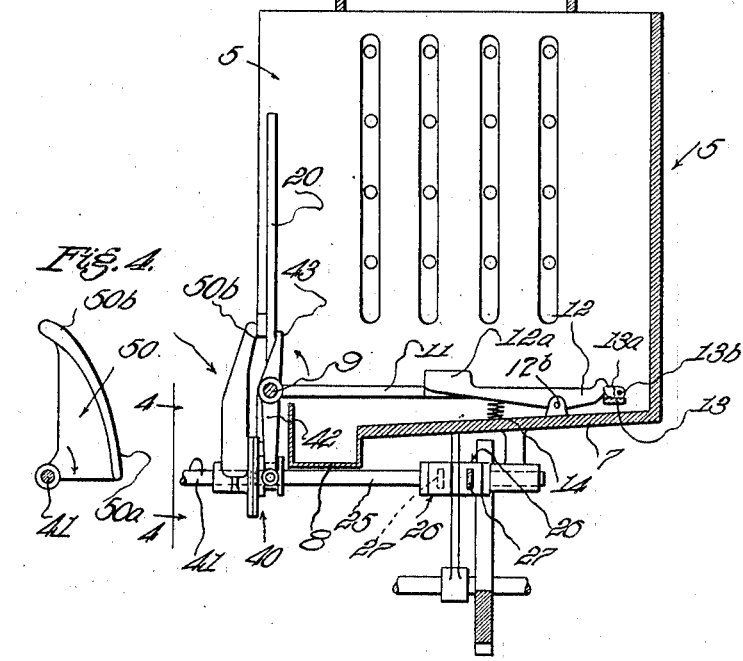

UNITED STATES PATENT OFFICE.

CHARLES R. KELLER, OF OXNARD, AND OTTO O. KELLER, OF SANTA PAULA, CALIFORNIA.

BEAN-HARVESTER.

1,059,301.  Specification of Letters Patent.  Patented Apr. 15, 1913.

Application filed September 2, 1911, Serial No. 647,324. Renewed March 15, 1913. Serial No. 754,644.

*To all whom it may concern:*

Be it known that we, CHARLES R. KELLER and OTTO O. KELLER, citizens of the United States, residing at Oxnard and Santa Paula, respectively, both in the county of Ventura, State of California, have invented new and useful Improvements in Bean-Harvesters, of which the following is a specification.

This invention relates to improvements in bean harvesters and specifically to improvements in our bean harvester for which we have filed an application for United States Letters Patent on August 15th, 1911, under Serial No. 644,194, and this invention relates particularly to improved means of bundling the beans preparatory to being placed on the ground for drying.

In the application above referred to our harvester was shown and described with a bean bundling apparatus comprising a winding mechanism which wound the bean vines up into a bundle and then ejected the bundle from the machine. In the present application we are showing an improved mechanism for accomplishing the bundling or bunching of the beans, which mechanism is more simple in construction and operation than the mechanism of our first application.

In the accompanying drawings: Figure 1 is a sectional plan view of our improvement. Fig. 2 is a vertical section taken on line 2—2 of Fig. 1. Fig. 3 is a vertical section taken on line 3—3 of Fig. 1. Fig. 4 is a detail view of a portion of the device and taken as indicated by line 4—4 of Fig. 3. Fig. 5 is a section taken as indicated by line 5—5 of Fig. 3, and showing the cutting knives of our improved mechanism in their closed position. Fig. 6 is a section taken similarly to Fig. 2, showing a modified form of actuating mechanism for the bunching means. Fig. 7 is a perspective illustrating a detail of our improved device.

In the drawings 5 designates a box into which the beans are fed through a chute 6, the box being of general cubical configuration. Box 5 is open at its top and front and preferably has a sloping bottom 7 down which any loose beans may move and be caught in a preferably removable box 8 at the lower end. This constitutes merely a means for catching any beans which may be shaken loose off the vines while the vines are being bundled and is typical of any other means for collecting such loose beans. This sloping bottom forms in reality a gravity operated chute for the beans; and any equivalent, such as a moving belt or conveyer, may be substituted therefor. Near the front and lower end of the box we have placed a transverse shaft 9 having springs 10 attached thereto and attached to the sides of the box, as shown in Fig. 1, to rotate the shaft in the direction indicated by the arrow. On shaft 9 and within the box is mounted a plurality of slats or fingers 11 which project horizontally and form a sort of false bottom for the box 5. A catch 12, shown most clearly in Fig. 3, hooks over a catch 13$^a$ on transverse piece 13 which is situated at the outer ends of the slats 11 and normally prevents the slats from moving in the direction indicated by the arrow. This catch 12 has a portion 12$^a$ which projects up above the slats 11 and a spring 14 pushes portion 12$^a$ up in place and holds the catch 12 in engagement with pivoted catch 13$^a$ so as to hold the slats down. Pivoted catch 13$^a$ is mounted on a pivot 13$^b$ so that its end engaged by catch 12 may move upwardly; but it is prevented from moving downwardly by catch 13$^a$ resting on transverse piece 13. When the beans are piled in the box and become sufficiently heavy to bear down portion 12$^a$, then the catch is released and the slats 11 move in the direction indicated to throw out any beans in a bundle which may have been placed in the box. When the slats 11 move back (hereinafter explained) the engaging end of catch 13$^a$ is lifted by striking catch 12 and then drops into place beneath catch 12. The spring 14 will then hold the slats down against the action of springs 10 tending to move them up; the spring 14 being light and having a large leverage over springs 10 for the reason that springs 10 act at a small radius around shaft 9 and the spring 14 acts at the ends of slats 11. Also mounted on shaft 9 is a series of vertical fingers or slats 20 which form a temporary front for the box 5 to prevent the beans which are delivered through chute 6 from falling out of the box.

Situated beneath the box 5 is a shaft 25 having thereon two cranks 26. Connecting rods 27 connect these cranks with oscillating arms 28 situated one on each side of the box 5 and slidably pivoted at 29. Pivots 29 slide in vertical slots 71 in the ends of framing 72. Pivots 73 (where connecting rods 27 are joined to arms 28) move in curved slots 70; and slots 70 and 71 are so arranged that the upper ends of arms 28 will move inwardly and downwardly and then upwardly and outwardly. The upper ends of these arms 28 are connected at 30 to plates 31 which carry either tamps 32 or prongs 33, as shown on the left and right hand sides respectively of Fig. 2. Shaft 25 is thus adapted by its rotation to cause tamps 32 or prongs 33 to reciprocate into and out of the box and to pack together any bean vines which are delivered thereto. When the bean vines have attained sufficient weight, and are packed in the meantime by the reciprocation of the tamps or prongs, then they press downwardly on portion 12$^a$ sufficiently to release the slats 11 and the bundle is thereupon ejected from the machine. It will be noted that the end portion 12$^a$ is placed farther from the pivot 12$^b$ of catch 12 than is the end engaging catch 13$^a$; so that the pressure required to push portion 12$^a$ down and to release the catch 13$^a$ is reduced. Pivot 12$^b$ may be placed farther from the end portion 12$^a$ and thus decrease further the pressure required to release the catch 13$^a$. Decreasing the necessary pressure in this manner renders more uniform the action of the device, in spite of the uneven packing of the bean vines. If the slats 11 should start upwardly when the cam 50 is in the position shown in Figs. 1 and 3, they could not continue their upward movement until the cam moves out of the way. The cam moves at a sufficiently high speed to allow the slats to move upwardly fast enough to throw out the bundle of vines. Should the slats 11 strike the prongs 33 when they are in the box 5, the springs 45 will pull the prongs out and allow the slats to pass. Should the cranks 26 be caught on dead center with the prongs in, they would be released manually; but this occurrence is very rare as springs 45 will act unless the cranks are exactly on dead center. At the same time that the false bottom formed by slats 11 is released and moves upwardly and outwardly, the shaft 25 is stopped from rotation through the medium of a clutch 40 which normally connects shaft 41 with shaft 25. Shaft 41 is being continually revolved from some suitable source of power. An arm 42 is loosely pivoted about shaft 9 and has an upper end 43 which engages with one of upright slats 20 and is thus held in the position shown when the slats 20 are in the position illustrated. In this position, arm 42, which engages directly with clutch 40, throws the two members of the clutch together and causes rotary movement to be transmitted from shaft 41 to shaft 25. Immediately the slats 20 move downwardly and to the left, the clutch is loosened and will discontinue the rotary connection between the two shafts. Shaft 25 will thereupon immediately cease rotation and the tampers or prongs will remain at rest. In order to insure that the tamps or prongs are in their outermost position when they are at rest, and thus to insure that the slats 11 may pass upwardly in the box 5, suitable means, such as springs 45, are provided to push arms 28 to their outermost position and thus to withdraw the tamps or prongs from the box. When the false bottom formed by slats 11 has moved upwardly to approximately the position now occupied by the slats 20, slats 20 will have moved forwardly and downwardly to a horizontal position. A cam 50 of peculiar formation is mounted on shaft 41 and revolves continually therewith. This cam has both a radial and an axial action, having a portion 50$^a$ which proceeds rapidly away from the shaft 41 and which will consequently push the slats 20 upwardly as shaft 41 revolves in the direction indicated; and having a portion 50$^b$ which proceeds longitudinally and will force the slats 20 longitudinally and to the right in Fig. 3 during the latter portion of the movement of slats 20 back to their original position. Thus, when the slats 11 spring up and out and throw the bundle of beans out of the box, it will be seen that they will be immediately replaced in position upon the first subsequent revolution of cam 50 on shaft 41. When the slats 11 are thus placed in position again, the clutch 40 is thrown into rotary engagement by reason of the arm 42 moving in the direction indicated and the prongs or tamps begin their reciprocation. The slats 11 are held down again by means of catch 12, portion 13$^a$ of transverse member 13 which is engaged by the catch 12 being pivoted at 13$^b$ so as to move over the head of the catch 12 on the downward movement of the slats.

In Fig. 5 we have shown our improved form of knife which embodies in reality two shearing elements 60 and 61 pivoted or otherwise equivalently mounted at 62; the idea being to bring the shearing edges 60$^a$ and 61$^a$ of the knives together on diagonal lines of approach. This enables us to cut the bean vines with a smaller expenditure of energy. In Fig. 5 we have shown the knives in their closed position; that is, after they have cut the bunch of beans passing through chute 6; and in Fig. 3 we have shown the knives in their open position, as they are when the beans are being forced through the chute down into box 5.

In Fig. 6 we have shown a modified form of apparatus for operating the bean bunching mechanism. The prongs or other bean engaging members 33$^a$ are mounted on oscillating members 80. Oscillating members 80 are mounted near their centers on cranks 82, so that, at their centers at least, they partake of the crank motion. These cranks 82 are driven in opposite directions by means of chain connections 85 from a shaft 25ª, corresponding to shaft 25 of Figs. 1, 2 and 3. Each of the oscillating members 80 is provided with a slot 83 engaging a crank 81, so that the members are moved transversely by the rotation of cranks 81 but are not moved longitudinally thereby. Cranks 81 are driven in the same directions as the corresponding cranks 82 by means of connections 84 with shaft 25ª; but corresponding cranks 81 and 82 are placed in opposite phases of rotation, as are also the cranks 82 with respect to each other. The operation of this mechanism may be inferred from the drawings. Supposing shaft 25ª to be rotating in a left hand direction, it will be seen that cranks 82 are rotating downwardly and outwardly away from each other. At the same time cranks 81 are rotating downwardly and inwardly toward each other. The members 80 being attached to cranks 82 will move downwardly and in doing so the beans will be packed down by the prongs 33ª. Simultaneously with this movement the prongs will be gradually withdrawn, for the reason that the upper ends of the members 80 are being moved away from each other while their lower ends are being moved toward each other. When each of the cranks has made a half revolution (they all rotate at the same speed) the members 80 will then be moving upwardly; but they will be thrown to such an angle that the prongs 33ª will be entirely outside the box 5ª. The prongs will then move inwardly and then down and outwardly as before explained.

From the foregoing it will be seen that the present described device is simpler in construction and operation than the one described in our former application. In this device all that is required is the constant rotation of a shaft 41, the rest of the actions being automatic within the bundling mechanism itself. It will be understood that we do not limit ourselves to this peculiar bundling action (the action of the tamps or prongs in pushing the bean vines together into a more solid mass) but wish to claim more or less broadly the combination of the different mechanisms for accomplishing these certain results.

Having described our invention, we claim:

1. A device of the character described, comprising a box, means for feeding matter to be bundled into the box, a packing mechanism operating within the box, a false bottom pivoted to the box and adapted to swing upwardly and outwardly therein, spring means for moving the false bottom, catch means for holding the false bottom in position within the box, said catch means being releasable by the weight of matter within the box, means for moving the false bottom in the direction opposite to that in which it is moved by the spring means, and packing mechanism operating downwardly and upwardly into the box.

2. A device of the character described, comprising a box, means for feeding material to be bundled into the box, a false bottom for the box and pivoted near one of its lateral edges and near its bottom, and adapted to swing upwardly and outwardly in the box, spring means for moving the false bottom in the direction aforesaid, catch means for holding the false bottom in a horizontal position, said catch means being releasable by the weight of material in the box, a continually revolving shaft, means operated by said shaft to return the false bottom to its horizontal position, a packing mechanism operating within the box, and connecting means between the packing mechanism and the constantly rotating shaft and controlled by the position of the false bottom, whereby the packing mechanism is intermittently operated.

3. A device of the character described, comprising a box, a packing mechanism operating within the box and comprising vine engaging members, and means to move said members downwardly and inwardly into the box, a false bottom pivoted to the box and adapted to swing upwardly and outwardly therein, means for moving the false bottom upwardly and outwardly, catch means for holding the false bottom in position within the box, said catch means being releasable by the weight of matter within the box, and means for returning the false bottom to its position where it is held by the catch means.

4. A device of the character described, comprising a box, a packing mechanism operating within the box and comprising vine engaging members, and means to move the said members downwardly and inwardly and then downwardly and outwardly through the box, a false bottom pivoted to the box and adapted to swing upwardly and outwardly therein, means for moving the false bottom upwardly and outwardly, catch means for holding the false bottom in position within the box, said catch means being releasable by the weight of the matter within the box, and means for returning the false bottom to its position where it is held by the catch means.

5. A device of the character described, comprising a bundling box, vine engaging members adapted to move downwardly through the box, a bottom adapted for movement to eject a bundle of vines from the box, and means controlled by the downward pressure of the vine bundle to cause the movement of the bottom to eject the bundle.

6. A device of the character described, comprising a bundling box having a vertical slot in its wall, a vine engaging member projecting horizontally through said slot, means to move said member downwardly through the box, a movable bottom in the box, means to move the bottom to eject a vine bundle therefrom, and means releasable by the downward pressure of the vine bundle to normally hold the bottom against movement.

7. In a device of the character described, a bundling box having vertical slots in its wall, vine engaging members projecting horizontally through the slots into the box, and means to move said members inwardly and downwardly and then outwardly and downwardly through the box.

In witness that we claim the foregoing we have hereunto subscribed our names this 23rd day of August 1911.

CHARLES R. KELLER.
OTTO O. KELLER.

Witnesses:
T. F. TWINTING,
GEO. E. HUME.

Copies of this patent may be obtained for five cents each, by addressing the "Commissioner of Patents, Washington, D. C."